United States Patent
Wu et al.

(10) Patent No.: US 12,014,556 B2
(45) Date of Patent: Jun. 18, 2024

(54) IMAGE RECOGNITION METHOD, APPARATUS, TERMINAL, AND STORAGE MEDIUM

(71) Applicant: TENCENT TECHNOLOGY (SHENZHEN) COMPANY LIMITED, Shenzhen (CN)

(72) Inventors: Minhui Wu, Shenzhen (CN); Huajie Huang, Shenzhen (CN); Yugeng Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 120 days.

(21) Appl. No.: 17/723,279

(22) Filed: Apr. 18, 2022

(65) Prior Publication Data
US 2022/0245954 A1  Aug. 4, 2022

Related U.S. Application Data

(63) Continuation of application No. PCT/CN2021/075124, filed on Feb. 3, 2021.

(30) Foreign Application Priority Data

Mar. 25, 2020 (CN) .......................... 202010217627.8

(51) Int. Cl.
*G06V 20/00* (2022.01)
*G06N 3/045* (2023.01)
(Continued)

(52) U.S. Cl.
CPC ............. *G06V 20/63* (2022.01); *G06N 3/045* (2023.01); *G06V 30/148* (2022.01); *G06V 30/18* (2022.01); *G06V 30/19127* (2022.01)

(58) Field of Classification Search
CPC ...... G06V 20/63; G06V 30/148; G06V 30/18; G06V 30/19127; G06V 10/82;
(Continued)

(56) References Cited

FOREIGN PATENT DOCUMENTS

| CN | 101625760 A | 1/2010 |
|----|-------------|--------|
| CN | 106295638 A | 1/2017 |

(Continued)

OTHER PUBLICATIONS

Zhou et al., EAST: An Efficient and Accurate Scene Text Detector, CVPR (Year: 2017).*
(Continued)

*Primary Examiner* — Ping Y Hsieh
*Assistant Examiner* — Xiao Liu
(74) *Attorney, Agent, or Firm* — ANOVA LAW GROUP, PLLC

(57) ABSTRACT

An image recognition method includes acquiring a target image, the target image being an image of a certificate to be recognized; text area recognition is performed on the target image to obtain a text area image of a target text corresponding to the certificate to be recognized; a text direction of the target text is determined according to the text area image; direction adjustment is performed on the text area image according to the text direction to obtain an adjusted text area image; and text recognition is performed on the adjusted text area image to obtain a text content of the target text.

20 Claims, 8 Drawing Sheets

(51) Int. Cl.
   *G06V 20/62*    (2022.01)
   *G06V 30/148*   (2022.01)
   *G06V 30/18*    (2022.01)
   *G06V 30/19*    (2022.01)

(58) Field of Classification Search
   CPC .. G06V 10/22; G06V 10/267; G06V 30/1478; G06N 3/045; G06N 3/044; G06N 3/08; G06F 18/24
   See application file for complete search history.

(56) References Cited

FOREIGN PATENT DOCUMENTS

| | | | | |
|---|---|---|---|---|
| CN | 108805800 A | | 11/2018 | |
| CN | 108885699 A | * | 11/2018 | ........... G06K 9/3258 |
| CN | 108885699 A | | 11/2018 | |
| CN | 109657673 A | | 4/2019 | |
| CN | 110443239 A | * | 11/2019 | |
| CN | 111444908 A | | 7/2020 | |
| WO | WO-2018054326 A1 | * | 3/2018 | ............. G06K 9/342 |

OTHER PUBLICATIONS

The World Intellectual Property Organization (WIPO) International Search Report for PCT/CN2021/075124 dated Apr. 25, 2021 7 Pages (including translation).

\* cited by examiner

IMAGE RECOGNITION METHOD, APPARATUS, TERMINAL, AND STORAGE MEDIUM

CROSS-REFERENCES TO RELATED APPLICATIONS

This application is a continuation application of PCT Patent Application No. PCT/CN2021/075124, entitled "IMAGE RECOGNITION METHOD AND APPARATUS, TERMINAL, AND STORAGE MEDIUM" and filed on Feb. 3, 2021, which claims priority to Chinese Patent Application No. 202010217627.8 filed on Mar. 25, 2020, the entire contents of both of which are incorporated herein by reference.

FIELD OF THE TECHNOLOGY

The present disclosure relates to the field of image processing, and in particular, to an image recognition method, apparatus, terminal, and storage medium.

BACKGROUND OF THE DISCLOSURE

At present, computers can recognize target texts of physical certificates such as bank cards, ID cards, and membership cards. For example, a user can use a smartphone to photograph a card face of a bank card, a corresponding application on the smartphone can recognize a card number displayed on the card face of the bank card without the need of manual input of the user, and the smartphone can automatically enter the bank card number of the user.

However, once a user cannot clearly and completely photograph a physical certificate from the front, or the layout of the physical certificate is different from common physical certificates, the user needs to re-photograph the physical certificate; otherwise, it will cause unrecognition, recognition error, slow recognition speed, and the like. Therefore, the current image recognition method is inefficient.

SUMMARY

An image recognition method, apparatus, terminal, and storage medium are provided in embodiments of the present disclosure, which can improve the efficiency of an image recognition method.

An image recognition method is provided in the embodiments of the present disclosure, including: acquiring a target image, the target image being an image of a certificate to be recognized; performing text area recognition on the target image to obtain a text area image of a target text corresponding to the certificate to be recognized; determining a text direction of the target text according to the text area image; performing direction adjustment on the text area image according to the text direction to obtain an adjusted text area image; and performing text recognition on the adjusted text area image to obtain a text content of the target text.

An image recognition apparatus is further provided in the embodiments of the present disclosure, including: an acquisition unit configured to acquire a target image, the target image being an image of a certificate to be recognized; a text unit configured to perform text area recognition on the target image to obtain a text area image of a target text corresponding to the certificate to be recognized; a direction unit configured to determine a text direction of the target text according to the text area image; an adjustment unit configured to perform direction adjustment on the text area image according to the text direction to obtain an adjusted text area image; and a recognition unit configured to perform text recognition on the adjusted text area image to obtain a text content of the target text.

A terminal is further provided in the embodiments of the present disclosure, including a processor and a memory storing a plurality of instructions. The processor loads the instructions from the memory to perform: acquiring a target image, the target image being an image of a certificate to be recognized; performing text area recognition on the target image to obtain a text area image of a target text corresponding to the certificate to be recognized; determining a text direction of the target text according to the text area image; performing direction adjustment on the text area image according to the text direction to obtain an adjusted text area image; and performing text recognition on the adjusted text area image to obtain a text content of the target text.

A non-transitory computer-readable storage medium storing a plurality of instructions is further provided in the embodiments of the present disclosure, and the instructions are adaptable to be loaded by a processor to perform the operations in any image recognition method provided in the embodiments of the present disclosure.

For recognizing a text content of a target text in a certificate photo, an Optical Character Recognition (OCR) technology is commonly used currently. The OCR technology is a commonly used character recognition technology that can recognize a text in an image containing black and white dots, convert it into a text format for further editing and processing. A specific recognition solution is performing image segmentation on a single character in the certificate image, and compare the segmented single character image with texts in a dictionary, so as to realize recognition of the single character. However, the method is low in accuracy and slow in speed. In addition, character recognition may be performed on the segmented single character image currently by using a deep learning method. However, the method has higher requirements on the layout of a certificate and a photographing angle, brightness, and completeness of the certificate photo. Once the certificate fails to be completely located in the center of the picture and vertically face a screen, or the layout of the certificate is different from a conventional one, the method is prone to identification errors.

In the embodiments of the present disclosure, a target image may be acquired, the target image being an image of a certificate to be recognized; text area recognition is performed on the target image to obtain a text area image of a target text corresponding to the certificate to be recognized, and a text direction of the target text is determined according to the text area image; direction adjustment is performed on the text area image according to the text direction to obtain an adjusted text area image; and text recognition is performed based on the adjusted text area image to obtain the target text of the certificate to be recognized.

Compared with the existing image recognition method, the present disclosure can recognize a certificate to be recognized appearing in a target image, recognize a location area of a target text corresponding to the certificate to be recognized, as well as a photographing angle direction of the target text in the location area. The present disclosure can intercept a text area image of the target text in the target image, and adjust the text area image according to an angle direction of the target text to correct an oblique or inverted target text in the text area image. This facilitates recognition of a specific text content of the target text in the certificate to be recognized, thereby improving the recognition accuracy.

Therefore, the present disclosure can accurately recognize certificates having different layouts, and can also adapt to images to be recognized at different photographing angles. There are no strict requirements on the brightness and completeness of certificate photos, and the recognition accuracy rate of this solution is higher. As a result, this solution improves the efficiency of the image recognition method.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present invention, and a person skilled in the art may still derive other accompanying drawings from these accompanying drawings without creative efforts.

DESCRIPTION OF EMBODIMENTS

The following clearly and completely describes the technical solutions in embodiments of the present disclosure with reference to accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

An image recognition method, apparatus, terminal, and storage medium are provided in embodiments of the present disclosure.

The image recognition apparatus may be specifically integrated in an electronic device, and the electronic device may be a device such as a terminal and a server. The terminal may be a device such as a mobile phone, a tablet computer, a smart Bluetooth device, a notebook computer, or a personal computer (PC); and the server may be a single server or a server cluster that includes a plurality of servers.

Figure 1A:
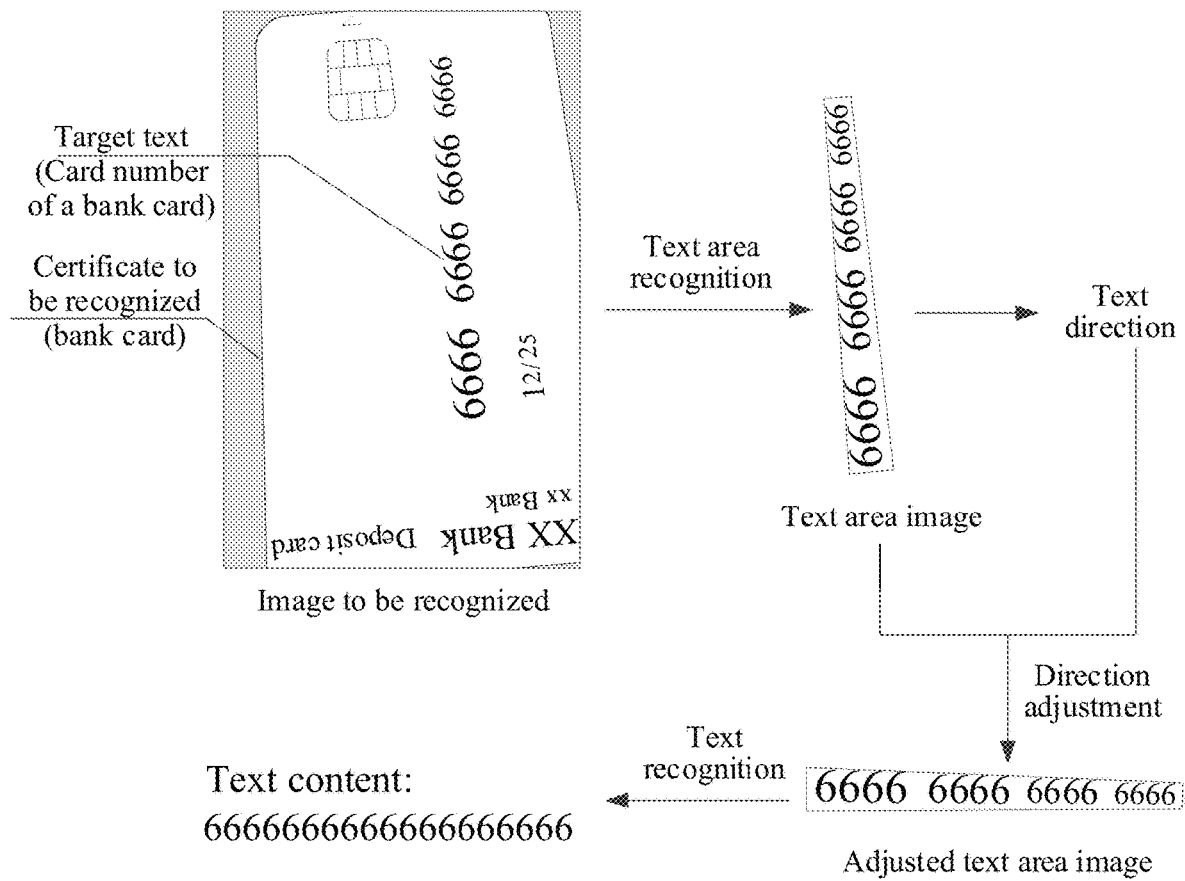
FIG. 1A is a schematic diagram of a scenario of an image recognition method according to an embodiment of the present disclosure.

For example, referring to FIG. 1A, the electronic device may be a smartphone. The smartphone may photograph a target image through a camera, and the target image may be a photo of a bank card to be recognized. The smartphone may perform text area recognition on the bank card photo to obtain a text area image of a card number of the bank card, determine a text direction of the card number of the bank card according to the text area image, then perform direction adjustment on the text area image according to the text direction to obtain an adjusted text area image, and finally perform text recognition based on the adjusted text area image to obtain a specific numeric content of the card number of the bank card.

Detailed descriptions are separately provided below. Sequence numbers of the following embodiments are not intended to limit preference orders of the embodiments.

Artificial Intelligence (AI) is a technology that uses digital computers to simulate environment perception, knowledge acquisition, and knowledge use of human. The technology enables machines to have functions similar to human perception, reasoning, and decision-making. AI software technologies mainly include several major directions such as a computer vision (CV) technology, a speech processing technology, a natural language processing technology, machine learning (ML), and deep learning.

CV is a technology that uses a computer to perform operations such as recognition, measurement, and further processing on a target image in replacement of human eyes. The computer vision technology usually includes technologies such as image processing, image recognition, image semantic understanding, image retrieval, virtual reality, augmented reality, synchronous positioning, and map construction, for example, image processing technologies such as image coloring and image stroke extraction.

Figure 1B:
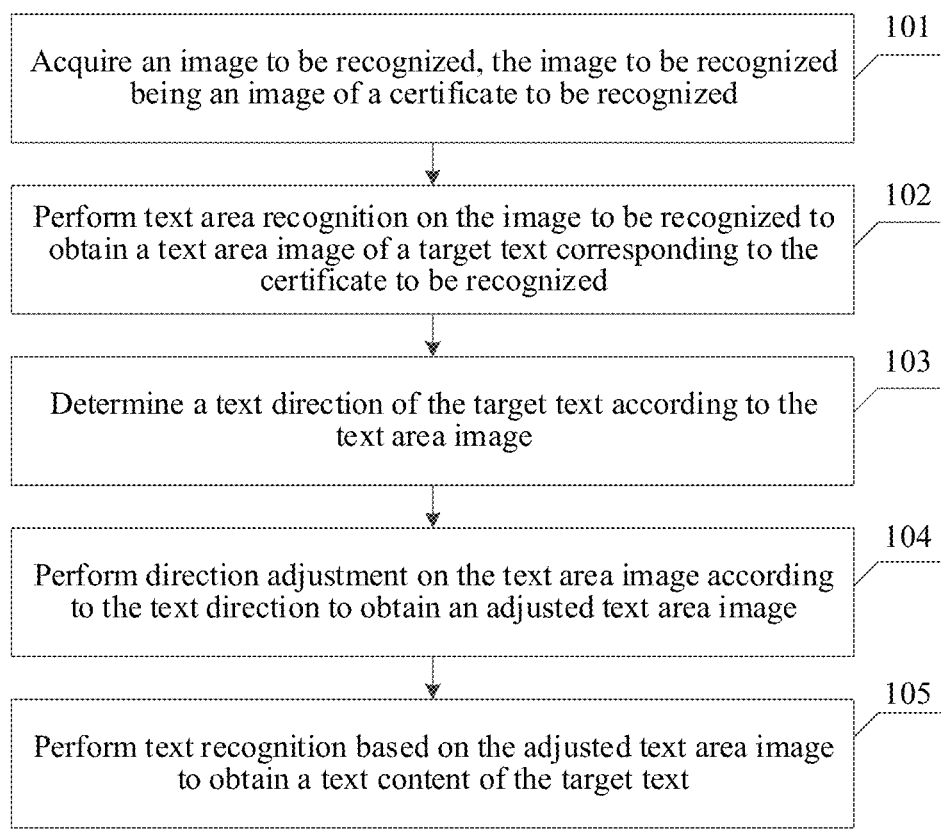
FIG. 1B is a first schematic flow chart of an image recognition method according to an embodiment of the present disclosure.

In this embodiment, an image recognition method based on artificial intelligence is provided, which uses the CV technology. As shown in FIG. 1B, a specific process of the image recognition method may include the following steps:

Step 101: Acquire a target image, the target image being an image of a certificate to be recognized.

The target image refers to an image including a certificate waiting to be recognized, and the certificate may be a bank card, an ID card, a visa, a membership card, and the like.

There are many methods of acquiring the target image. For example, the target image may be acquired by photographing a certificate to be recognized by a sensor such as a camera mounted on the image recognition apparatus; or may be acquired from an image database through the network; or may be read from a local memory, or the like.

Step 102: Perform text area recognition on the target image to obtain a text area image of a target text corresponding to the certificate to be recognized.

The target text refers to a specific text in the certificate to be recognized. For example, the target text may be a certificate number text, a certificate name text, a certificate holder name text, and the like in the certificate to be recognized.

The text area image refers to an image of an area where the target text appears in the target image.

For example, referring to FIG. 1A, the target image is a bank card photo photographed by a user, the certificate to be recognized is a bank card, and the target text is a card number of the bank card. In step 102, text area recognition may be performed on the bank card photo to obtain a text area image of the card number of the bank card in the bank card photo.

The text area image may have a variety of geometric shapes, such as a triangular shape, a diamond shape, a rectangular shape, and a circular shape. For example, as shown in FIG. 1A, the text area image may be an irregular quadrilateral.

In some embodiments, in order to reduce the amount of calculation and improve the recognition efficiency, before the text area recognition is performed, it may be detected whether there is a certificate to be recognized in the target image. For example, step 102 may include the following steps:
  (1) performing image feature extraction on the target image to obtain an image feature of the target image;
  (2) performing image type recognition on the target image according to the image feature by using an image classification network, and determining an image type of the target image; and
  (3) when the image type of the target image is a preset certificate type, performing text area segmentation on the target image according to the image feature by using a region-based detection network to obtain the text area image of the target text corresponding to the certificate to be recognized.

In this embodiment, any image feature extraction network may be used to perform image feature extraction on the target image. For example, a variety of convolutional neural network models, such as LeNet, VGG, AlexNet, Unet, GoogleNet, and RCNN, may be used.

The obtained image feature may be a feature vector, a feature matrix, a feature map, or the like.

In this embodiment, the image classification network and the region-based detection network may be any convolutional neural network model.

The image type of the target image may include a preset certificate type, an unrecognizable type, another image content type, and the like. For example, when image type recognition is performed on a bank card photo, it may be recognized that the image type of the photo is a bank card type. When the preset certificate type is an ID card type and the photo is not an ID card type, in this embodiment, no further processing is required on the photo, so the image recognition efficiency is improved.

Figure 1C:
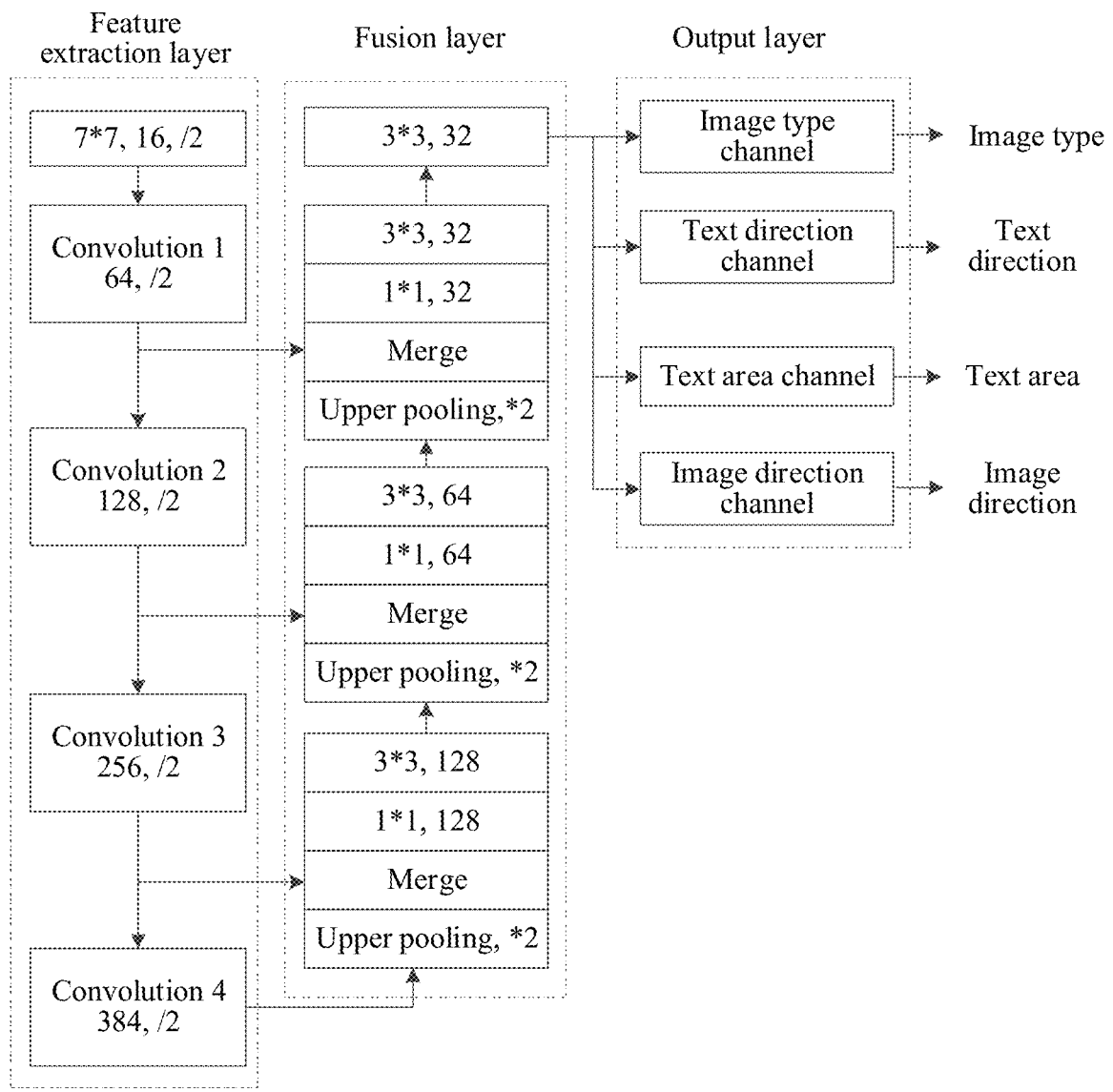
FIG. 1C is a schematic diagram of an Efficient and Accurate Scene Text Detector (EAST) network structure of an image recognition method according to an embodiment of the present disclosure.

In some embodiments, a Region Based Convolutional Neural Networks (RCNN) model may be used to perform step 102. For example, an Efficient and Accurate Scene Text Detector (EAST) model may be used to perform step 102. Referring to FIG. 1C, the EAST model may include a feature extraction layer, a feature fusion layer, and an output layer. The output layer may include a plurality of channels. For example, the output layer may include an image classification channel and an area detection channel. The image classification channel may be any type of image classification network, and the area detection channel may be any type of region-based detection network.

The feature extraction network may be the feature extraction layer and the feature fusion layer of the EAST model. The feature extraction layer and the feature fusion layer of the EAST model are a Unet network, which may recognize features at multiple scales and further splice and fuse the recognized features at multiple scales.

In some embodiments, in order to reduce the amount of calculation and improve the efficiency of feature extraction, an efficient lightweight network may be used as the image feature extraction network in the EAST model, and the step of "performing image feature extraction on the target image to obtain an image feature of the target image" may include the following steps:
  A. performing image segmentation processing on the target image to obtain an image segment group, where the image segment group may include a plurality of image segments;
  B. performing multi-scale feature extraction on the image segment group by using a group convolutional network to obtain a plurality of image segment feature groups in different sizes (e.g., different dimensions), where image segment features in each image feature group are in the same size; and
  C. performing feature fusion processing based on the image segment feature groups in different sizes to obtain the image feature of the target image.

The lightweight network may be any type of group convolutional network, such as Shufflenet and Mobilenet, to perform image feature extraction on the target image to obtain the image feature of the target image.

The group convolutional network is composed of a plurality of Group Convolutions, the group convolutions may group different feature maps, and then the feature maps of each group are convolved by using different convolution kernels. Compared with a Channel Dense Connection method of general full-channel convolution, the group convolutional network, as a Channel Sparse Connection method, can effectively increase the convolution speed, thereby reducing the amount of calculation.

In some embodiments, in addition to the image classification channel and the area detection channel, the output layer of the EAST network may also include a certificate direction channel, in which a certificate direction of the target image may be recognized. The certificate direction refers to a front direction of the certificate to be recognized in the target image. For example, referring to FIG. 1D, the certificate direction of the bank card in a photo A is 0°, and the certificate direction of the bank card in a photo B is 170°.

Figure 1D:
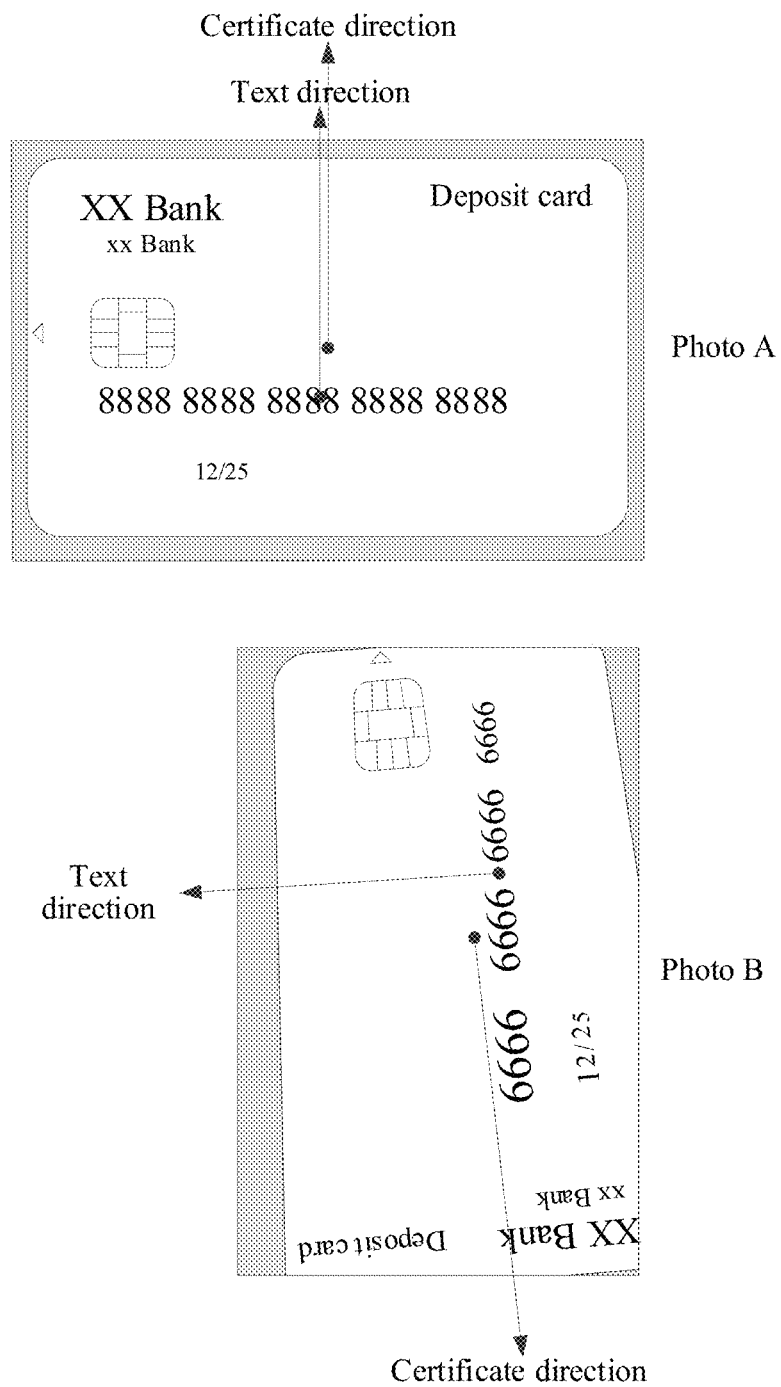
FIG. 1D is a schematic diagram of certificate directions and text directions of certificates having different layouts in an image recognition method according to an embodiment of the present disclosure.

The layouts of some certificates are irregular, for example, the bank card shown in the photo B in FIG. 1D has a certificate direction different from the text direction; therefore, performing direction adjustment on the text area image by using only the certificate direction may cause misjudgment. As a result, performing direction adjustment on the text area image by using the certificate direction and the text direction at the same time can effectively reduce the misjudgment rate. Therefore, after step 102 of "performing image type recognition on the target image according to the image feature by using an image classification network, and determining an image type of the target image", the certificate direction of the target image may be determined according to the image feature by using the image classification network. In step 103, direction adjustment may be performed on the text area image by using the certificate direction and the text direction at the same time.

In some embodiments, the step of "performing text area segmentation on the target image according to the image feature by using a region-based detection network to obtain the text area image of the target text corresponding to the certificate to be recognized" may include the following steps:
  determining a text area location feature according to the image feature by using the region-based detection network;
  determining text area location feature points in the target image according to the text area location feature; and segmenting the target image according to the text area location feature points to obtain a text area image, the text area image being an image including the target text.

The text area location feature points may be expressed in the form of coordinates. For example, when the text area is a quadrilateral, the text area location feature points are (0, 0), (0, 4), (2, 0), (2, 4), and the text area is a rectangular area in a size of 4*2.

The text area corresponding to the text area location feature points may be segmented in the target image, so as to obtain the text area image.

In some embodiments, a text direction of the target text in the target image may be recognized in the area detection channel of the output layer of the EAST network. The text direction refers to a front direction of the target text in the target image. For example, referring to FIG. 1D, the text direction of the bank card in the photo A is 0°, and the text direction of the bank card in the photo B is 260°.

In some embodiments, in order to improve the accuracy of recognizing the text direction, the region-based detection network may include a multi-channel output layer. The step of "determining the text direction of the target text according to the direction feature of the text area image by using the region-based detection network" may include the following steps:
    determining direction prediction values of pixels in the text area image according to the direction feature in the multi-channel output layer;
    performing statistics on the direction prediction values of the pixels in the text area image to obtain a global direction value of the text area image; and
    determining the text direction of the target text according to the global direction value.

In this embodiment, the direction of each pixel in the text area image may be predicted, statistics may be performed on the directions of the pixels to determine a global direction value of the text area image, and the text direction of the target text may be determined according to the global direction value.

For example, the global direction value of the text area image is 266, and it may be determined that the text direction of the target text is 266° clockwise.

Step 103: Determine the text direction of the target text according to the text area image.

In some embodiments, in step 102, after performing the step of "performing image type recognition on the target image according to the image feature by using an image classification network, and determining an image type of the target image," the certificate direction of the target image may be determined according to the image feature by using the image classification network. At this time, direction adjustment may be performed on the text area image according to the text direction and the certificate direction of the certificate to be recognized to obtain the adjusted text area image.

The layouts of some certificates are irregular, for example, the bank card shown in the photo B in FIG. 1D has a certificate direction different from the text direction; therefore, performing direction adjustment on the text area image by using only the certificate direction may cause misjudgment. As a result, performing direction adjustment on the text area image by using the certificate direction and the text direction at the same time can effectively reduce the misjudgment rate. Therefore, after step 102 of "performing image type recognition on the target image according to the image feature by using an image classification network, and determining an image type of the target image", the certificate direction of the target image may be determined according to the image feature by using the image classification network. In step 103, direction adjustment may be performed on the text area image by using the certificate direction and the text direction at the same time.

In some embodiments, due to a different layout of the certificate, the text direction and the certificate direction may not be the same. Therefore, the certificate direction may be used to assist in training the region-based detection network, thereby improving the accuracy of the region-based detection network in recognizing the text direction. Step 103 may include the following steps:
    acquiring a training sample image, a preset image classification network, and a preset region-based detection network, the training sample image being annotated with a certificate direction and a text direction;
    processing the training sample image by using the preset image classification network to obtain a certificate direction training result;
    training the preset region-based detection network according to the training sample image and the certificate direction training result, until the preset region-based detection network is converged, to obtain the region-based detection network; and
    determining the text direction of the target text according to the text area image by using the region-based detection network.

Step 104: Perform direction adjustment on the text area image according to the text direction to obtain an adjusted text area image.

In some embodiments, in order to reduce the amount of calculation and improve the efficiency of direction adjustment, the text direction recognized in step 103 may include a first direction, a second direction, a third direction, and a fourth direction. The first direction refers to a positive direction of the target image, the second direction refers to 90 degrees clockwise from the positive direction of the target image, the third direction refers to 180 degrees clockwise from the positive direction of the target image, and the fourth direction refers to 270 degrees clockwise from the positive direction of the target image. The step of "performing direction adjustment on the text area image according to the text direction to obtain an adjusted text area image" may include the following steps:
    when the text direction is the first direction, regarding the text area image as the adjusted text area image;
    when the text direction is the second direction, rotating the text area image counterclockwise by 90 degrees to obtain the adjusted text area image;
    when the text direction is the third direction, rotating the text area image counterclockwise by 180 degrees to obtain the adjusted text area image; and
    when the text direction is the fourth direction, rotating the text area image counterclockwise by 270 degrees to obtain the adjusted text area image.

In some other embodiments, in order to improve the adjustment accuracy, the text direction recognized in step 103 may include a plurality of different directions, for example, 1 degree clockwise from the positive direction of the target image, 2 degrees clockwise from the positive direction of the target image, 3 degrees clockwise from the positive direction of the target image, 4 degrees clockwise from the positive direction of the target image, and the like. At this time, the method of direction adjustment is similar to the above method, and it is only required to rotate in the reverse direction by the same degrees.

Step 105: Perform text recognition based on the adjusted text area image to obtain a text content of the target text.

In some embodiments, in order to improve the accuracy of text content recognition, any convolutional recurrent neural network may be used to perform step 105.

The convolutional recurrent neural network may include a convolutional layer, a recurrent layer, and a transcription layer.

In some embodiments, in order to reduce the amount of calculation and improve the calculation efficiency, the convolutional layer of the convolutional recurrent neural network may be any type of lightweight group convolutional network, such as Shufflenet and Mobilenet.

In some embodiments, in order to improve the recognition accuracy of the text content and improve the logical closeness of the time sequence between texts, the recurrent layer of the convolutional recurrent neural network may be any type of bidirectional recurrent network, such as a Bi-directional Long Short-Term Memory (BiLSTM) network.

For example, in some embodiments, step 105 may be performed by using a convolutional recurrent neural network that may include Shufflenet as a convolutional layer and BiLSTM as a recurrent layer. Therefore, step 105 may include the following steps:

performing image segmentation processing on the text area image to obtain a text area image segment;

performing feature extraction on the text area image segment by using a group convolutional network to obtain a text area image segment feature;

determining a target text feature according to the text area image segment feature; and performing text recognition based on the target text feature by using a bidirectional recurrent network to obtain the text content of the target text.

Specifically, the BiLSTM has a forward layer and a backward layer. Both the forward layer and the backward layer have their corresponding hidden layer states. The hidden layer states may be used for memorizing temporal logic of the text. Therefore, in some embodiments, the step of "performing text recognition based on the target text feature by using a bidirectional recurrent network to obtain the text content of the target text" may include the following steps:

determining a current moment in the bidirectional recurrent network, a forward hidden layer state corresponding to a previous moment of the current moment, and a backward hidden layer state corresponding to a next moment of the current moment;

determining a forward hidden layer state of the forward layer at the current moment according to the target text feature and the forward hidden layer state of the forward layer at the previous moment;

determining a backward hidden layer state of the backward layer at the current moment according to the target text feature and the backward hidden layer state of the backward layer at the next moment;

determining a text semantic vector according to the forward hidden layer state of the forward layer at the current moment and the backward hidden layer state of the backward layer at the current moment; and determining the text content of the target text according to the text semantic vector.

In some embodiments, text recognition is performed in step 105 by using a recurrent convolutional network. In order to align the image of the text with the content and improve the accuracy of recognition, before step 105 is performed, a Connectionist temporal classifier (CTC) may also be used to train the recurrent convolutional network in advance, including the following steps:

acquiring a text area training sample image and a preset recurrent convolutional network, where the text content of the target text is annotated in the text area training sample image, and the preset recurrent convolutional network may include a group convolutional network, a bidirectional recurrent network, and a connectionist temporal classifier; and training the preset recurrent convolutional network according to the text area training sample image, until the connectionist temporal classifier determines that the preset recurrent convolutional network is converged, to obtain a recurrent convolutional network.

As can be seen from the above, in the embodiments of the present disclosure, a target image may be acquired, the target image being an image of a certificate to be recognized; text area recognition is performed on the target image to obtain a text area image of a target text corresponding to the certificate to be recognized, a text direction of the target text is determined according to the text area image; direction adjustment is performed on the text area image according to the text direction to obtain an adjusted text area image; and text recognition is performed based on the adjusted text area image to obtain a text content of the target text.

As a result, in this solution, the direction adjustment may be performed on the text area image of the target text, so that the text area image in the positive direction may be recognized, thereby realizing the recognition of certificates having different layouts and different photographing angles, and improving the accuracy of recognition. Therefore, the efficiency of the image recognition method is improved.

According to the method described in the foregoing embodiments, the following further provides detailed description.

Referring to FIG. 1D, FIG. 1D includes bank card photos having two layouts. A photo A is a bank card having a regular layout. The front of the bank card is completely photographed. The photographing angle is perpendicular to a lens, and the direction of the bank card is the same as the direction of a card number thereof. A photo B is a bank card having a special layout. The photographing angle of the bank card is not perpendicular to the lens, the front of the bank card is upside down, and the bank card has not been photographed completely.

In this embodiment, the card numbers of the bank cards in the photo A and the photo B may be recognized at the same time. By taking the card number recognition of the photo B as an example, the method of the embodiment of the present disclosure will be described below in detail.

Figure 2A:
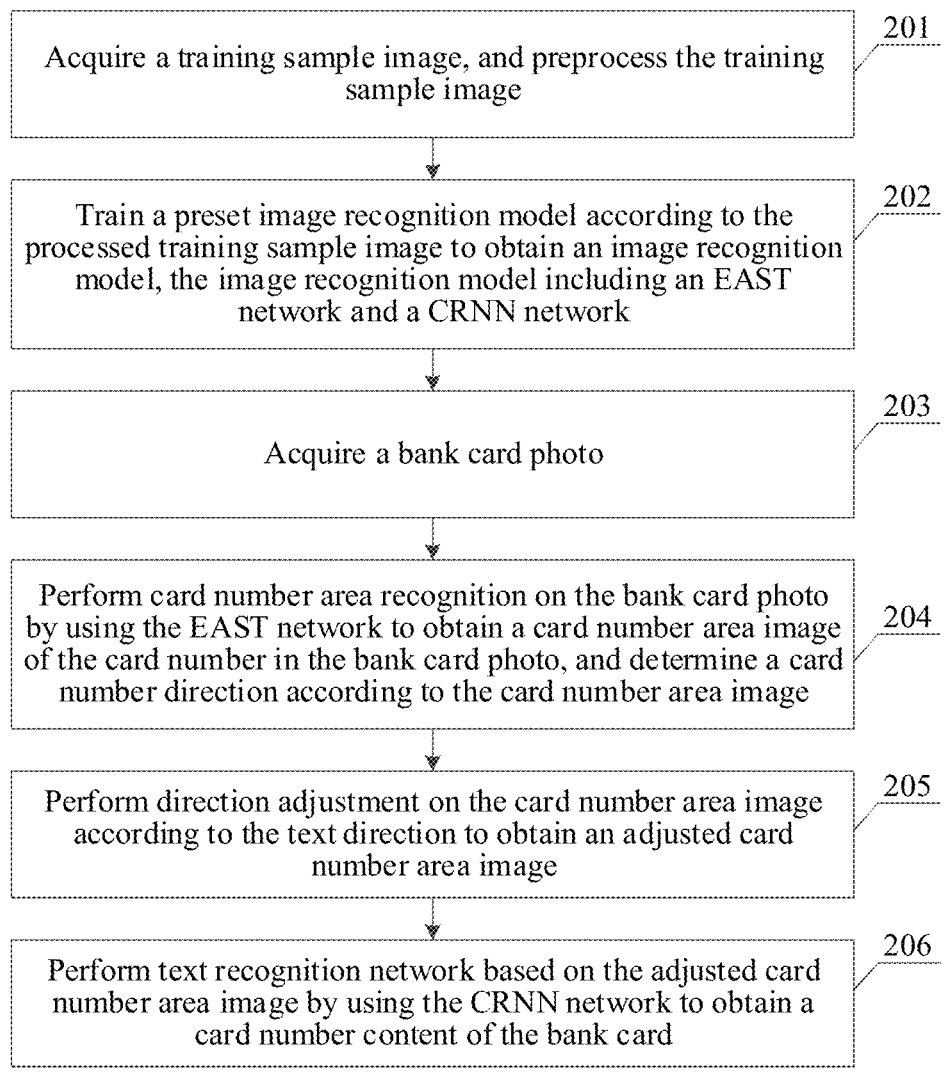
FIG. 2A is a second schematic flow chart of an image recognition method according to an embodiment of the present disclosure.

As shown in FIG. 2A, a specific process of an image recognition method includes the following steps:

Step 201: Acquire a training sample image, and preprocess the training sample image.

In this embodiment, the training sample image may be a bank card photo. The bank card photo may be acquired from a photo gallery, or photographed by a technician, or the like, and its source is not required here.

Preprocessing such as annotating, screening, and cleaning may be performed on the training sample image by the technician.

Figure 2B:
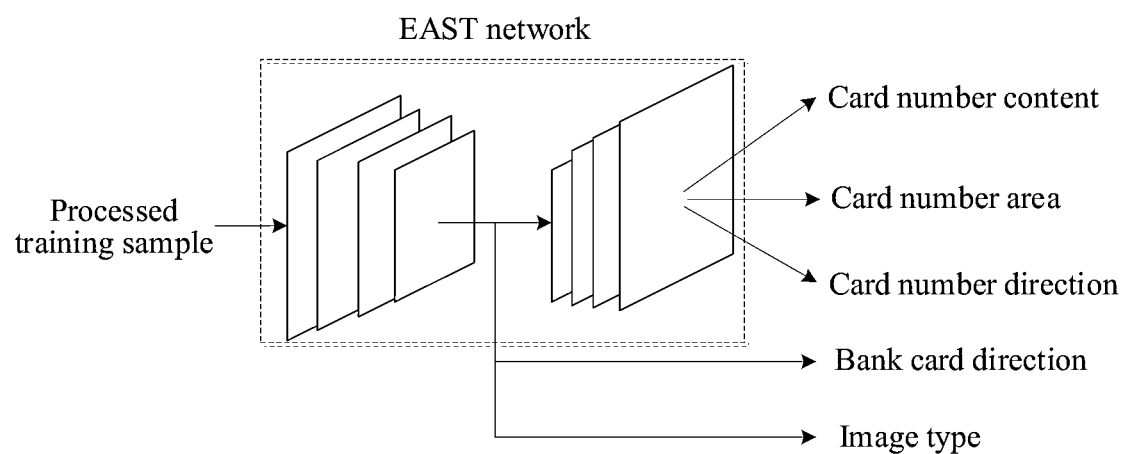
FIG. 2B is a schematic diagram of an EAST network training process of an image recognition method according to an embodiment of the present disclosure.

Referring to FIG. 2B, the training sample image may be annotated with its photo type, such as a bank card type, an ID card type, a passport type, a non-certificate type, and an unrecognized type.

The training sample image may also be annotated with a bank card direction of the bank card, a card number area of the card number, a card number content, a card number direction, and the like.

Step 202: Train a preset image recognition model according to the processed training sample image to obtain an image recognition model, the image recognition model including an EAST network and a CRNN network.

In this embodiment, the preset image recognition model includes the EAST network and the CRNN network.

Referring to FIG. 2B, the EAST network may include a feature extraction layer, a feature fusion layer, and an output layer. The output layer includes an image type channel and a card number direction channel. Information such as the image type, card number direction, card number area, and card number content of the training sample image is obtained in the output layer.

In order to improve the efficiency of feature extraction and fusion, the feature extraction layer and the feature fusion layer may use a Shufflenet network, a Mobilenet network, and the like.

In the image type channel, the EAST network may predict the image type of the training sample image; and the direction of the card number in the training sample image may be predicted in the card number direction channel.

Figure 2C:
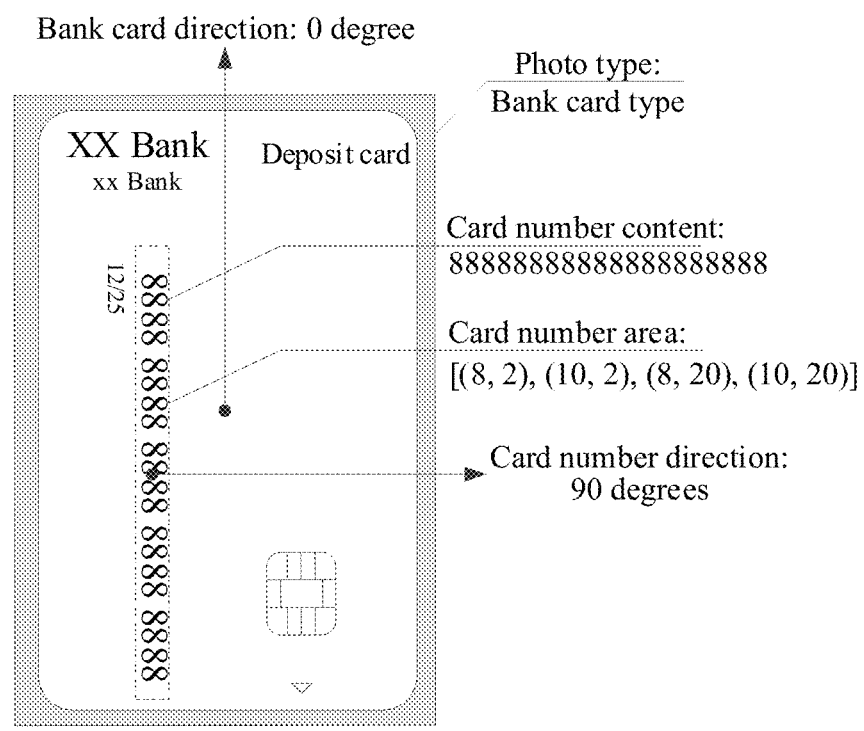
FIG. 2C is a schematic diagram of annotating training samples of an image recognition method according to an embodiment of the present disclosure.

Referring to FIG. 2C, due to the different bank card layouts, the bank card directions and the card number directions may also be different. Moreover, referring to FIG. 1A, the bank card in the bank card photo is not photographed completely, and therefore, the background in the photo may also interfere the determination of the card number direction. As a result, in some embodiments, the output layer further includes a bank card direction channel. The bank card direction channel may predict the direction of the bank card in the training sample image, for assisting the card number direction channel to determine the card number direction.

The CRNN network may be configured to recognize the card number content, and composed of a CNN, a BiLSTM, and a CTC. The CNN network may be a Shufflenet network, for improving the recognition efficiency.

Step 203: Acquire a bank card photo.

In this embodiment, the bank card photo may be photographed by a user using a smartphone.

Step 204: Perform card number area recognition on the bank card photo by using the EAST network to obtain a card number area image of the card number in the bank card photo, and determine a card number direction according to the card number area image.

First, the bank card photo may be input into the EAST network. The image direction channel in the output layer of the EAST network may be used for determining whether the photo includes a bank card. When the photo does not include a bank card, the recognition is stopped, and the user is prompted to photograph once again. When the photo includes a bank card, the following processing steps may be performed continuously.

In the card number area channel of the output layer of the EAST network, a card number area position in the bank card photo may be detected. The card number area position may be described by a rotating rectangular frame. For example, the card number area position is described by 4 corner point positions of the rotating rectangular frame.

Then, a main direction of a numeric string of the card number of the bank card may be predicted in the card number direction channel of the output layer of the EAST network.

Step 205: Perform direction adjustment on the card number area image according to the text direction to obtain an adjusted card number area image.

In this embodiment, the card number area image may be rotated to be positive according to the card number direction.

Step 206: Perform text recognition based on the adjusted card number area image by using the CRNN network to obtain a card number content of the bank card.

Finally, text recognition network may be completed by inputting the card number area image rotated to the positive direction into the CRNN network to obtain the card number content of the bank card.

As can be seen from the above, in this embodiment, a training sample image may be acquired and preprocessed; a preset image recognition model is trained according to the processed training sample image to obtain an image recognition model, the image recognition model including an EAST network and a CRNN network; a bank card photo is acquired; card number area recognition is performed on the bank card photo by using the EAST network to obtain a card number area image of the card number in the bank card photo, and a card number direction is determined according to the card number area image; direction adjustment is performed on the card number area image according to the text direction to obtain an adjusted card number area image; and text recognition is performed based on the adjusted card number area image by using the CRNN network to obtain a card number content of the bank card.

Therefore, in the embodiments of the present disclosure, the recognition of bank card images photographed at multiple angles and in different directions may be supported. The embodiments of the present disclosure have good adaptability to the layout of the certificate, low requirements for user photographing, and at the same time ensure the speed and accuracy of recognition, thereby improving the efficiency of the image recognition method.

In order to better implement the above method, an image recognition apparatus is further provided in the embodiments of the present disclosure. The image recognition apparatus may be specifically integrated in an electronic device, and the electronic device may be a device such as a terminal and a server. The terminal may be a device such as a mobile phone, a tablet computer, a smart Bluetooth device, a notebook computer, or a PC; and the server may be a single server or a server cluster that includes a plurality of servers.

For example, in this embodiment, the method of the embodiments of the present disclosure will be described in detail by taking the specific integration of the image recognition apparatus in XX as an example.

Figure 3:
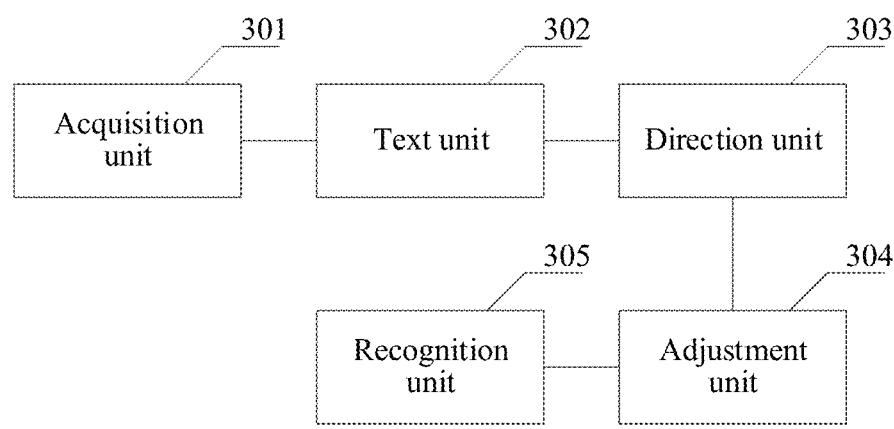
FIG. 3 is a first schematic structural diagram of an image recognition apparatus according to an embodiment of the present disclosure.

For example, as shown in FIG. 3, the image recognition apparatus may include an acquisition unit 301, a text unit 302, a direction unit 303, an adjustment unit 304, and a recognition unit 305, which are described in the following:

(1) Acquisition Unit 301

The acquisition unit 301 may be configured to acquire a target image, the target image being an image of a certificate to be recognized.

(2) Text Unit 302

The text unit 302 may be configured to perform text area recognition on the target image to obtain a text area image of a target text corresponding to the certificate to be recognized.

In some embodiments, the text unit 302 may include an image feature sub-unit, an image type sub-unit, and a text area sub-unit, which are described in the following:

(1) Image Feature Sub-Unit:

The image feature sub-unit may be configured to perform image feature extraction on the target image to obtain an image feature of the target image.

In some embodiments, the image feature sub-unit may be configured to perform image segmentation processing on the target image to obtain an image segment group, where the image segment group may include a plurality of image segments;

perform multi-scale feature extraction on the image segment group by using a group convolutional network to obtain a plurality of image segment feature groups in different sizes, where image segment features in each image feature group are in the same size; and perform feature fusion processing based on the image segment feature groups in different sizes to obtain the image feature of the image be recognized.

(2) Image Type Sub-Unit:

The image type sub-unit may be configured to perform image type recognition on the target image according to the image feature by using an image classification network, and determine an image type of the target image.

In some embodiments, the image type sub-unit may further be configured to determine a certificate direction of the target image according to the image feature by using the image classification network.

(3) Text Area Sub-Unit:

The text area sub-unit may be configured to, when the image type of the target image is a preset certificate type, perform text area segmentation on the target image according to the image feature by using a region-based detection network to obtain the text area image of the target text corresponding to the certificate to be recognized.

In some embodiments, the text area sub-unit may include a location feature sub-module, a location feature point sub-module, and a segmentation sub-module, which are described in the following:

A. Location Feature Sub-Module:

The location feature sub-module is configured to determine a text area location feature according to the image feature by using the region-based detection network.

B: Location Feature Point Sub-Module:

The location feature point sub-module is configured to determine text area location feature points in the target image according to the text area location feature.

In some embodiments, the location feature sub-module may further be configured to determine a direction feature of the target text in the text area image according to the image feature by using the region-based detection network; and the "determining the text direction of the target text according to the text area image" may include the following step:

determining the text direction of the target text according to the direction feature of the text area image by using the region-based detection network.

In some embodiments, the region-based detection network may include a multi-channel output layer. When the location feature sub-module is configured to determine the text direction of the target text according to the direction feature of the text area image by using the region-based detection network, it may be specifically configured to:

determine direction prediction values of pixels in the text area image according to the direction feature in the multi-channel output layer;

perform statistics on the direction prediction values of the pixels in the text area image to obtain a global direction value of the text area image; and determine the text direction of the target text according to the global direction value.

C. Segmentation Sub-Module:

The segmentation sub-module is configured to segment the target image according to the text area location feature points to obtain a text area image, the text area image being an image including the target text.

In some embodiments, the text unit 302 may include an area segment sub-unit, an area segment feature sub-unit, a text feature sub-unit, and a text recognition sub-unit, which are described in the following:

(1) Area Segment Sub-Unit:

The area segment sub-unit may be configured to perform image segmentation processing on the text area image to obtain a text area image segment.

(2) Area Segment Feature Sub-Unit:

The area segment feature sub-unit is configured to perform feature extraction on the text area image segment by using a group convolutional network to obtain a text area image segment feature.

(3) Text Feature Sub-Unit:

The text feature sub-unit may be configured to determine a target text feature according to the text area image segment feature.

(4) Text Recognition Sub-Unit:

The text recognition sub-unit may be configured to perform text recognition based on the target text feature by using a bidirectional recurrent network to obtain the text content of the target text.

In some embodiments, the bidirectional recurrent network may include a forward layer and a backward layer, and the text recognition sub-unit may be configured to:

determine a current moment in the bidirectional recurrent network, a forward hidden layer state corresponding to a previous moment of the current moment, and a backward hidden layer state corresponding to a next moment of the current moment; determine a forward hidden layer state of the forward layer at the current moment according to the target text feature and the forward hidden layer state of the forward layer at the previous moment; determine a backward hidden layer state of the backward layer at the current moment according to the target text feature and the backward hidden layer state of the backward layer at the next moment; determine a text semantic vector according to the forward hidden layer state of the forward layer at the current moment and the backward hidden layer state of the backward layer at the current moment; and determine the text content of the target text according to the text semantic vector.

(3) Direction Unit 303:

The direction unit 303 may be configured to determine a text direction of the target text according to the text area image.

In some embodiments, the text unit 302 may include an image type sub-unit. The image type sub-unit may further be configured to determine a certificate direction of the target image according to the image feature by using the image classification network. At this point, the direction unit 303 is configured to perform direction adjustment on the text area image according to the text direction and the certificate direction of the certificate to be recognized to obtain the adjusted text area image.

In some embodiments, the text direction may include a first direction, a second direction, a third direction, and a fourth direction, and the direction unit 303 may be configured to:

when the text direction is the first direction, regard the text area image as the adjusted text area image;

when the text direction is the second direction, rotate the text area image counterclockwise by 90 degrees to obtain the adjusted text area image;

when the text direction is the third direction, rotate the text area image counterclockwise by 180 degrees to obtain the adjusted text area image; and when the text direction is the fourth direction, rotate the text area image counterclockwise by 270 degrees to obtain the adjusted text area image.

In some embodiments, the direction unit 303 is configured to:

acquire a training sample image, a preset image classification network, and a preset region-based detection network, the training sample image being annotated with a certificate direction and a text direction;

process the training sample image by using the preset image classification network to obtain a certificate direction training result;

train the preset region-based detection network according to the training sample image and the certificate direction training result, until preset region-based detection network is converged, to obtain the region-based detection network; and determine the text direction of the target text according to the text area image by using the region-based detection network.

(4) Adjustment Unit 304:

The adjustment unit 304 may be configured to perform direction adjustment on the text area image according to the text direction to obtain an adjusted text area image.

(5) Recognition Unit 305:

The recognition unit 305 may be configured to perform text recognition based on the adjusted text area image to obtain a text content of the target text.

In some embodiments, the recognition unit 305 may further be configured to:

acquire a text area training sample image and a preset recurrent convolutional network, where the text content of the target text is annotated in the text area training sample image, and the preset recurrent convolutional network may include a group convolutional network, a bidirectional recurrent network, and a connectionist temporal classifier; and train the preset recurrent convolutional network according to the text area training sample image, until the connectionist temporal classifier determines that the preset recurrent convolutional network is converged, to obtain a recurrent convolutional network.

In some embodiments, the recognition unit 305 may be configured to:

perform text recognition based on the adjusted text area image by using the recurrent convolutional network to obtain the text content of the target text.

During specific implementations, the foregoing units may be implemented as independent entities, or may be combined in different manners, or may be implemented as the same entity or several entities. For specific implementations of the foregoing units, refer to the foregoing method embodiments. Details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

As can be seen from the above, the image recognition apparatus of this embodiment acquires, by an acquisition unit, a target image, the target image being an image of a certificate to be recognized; performs, by a text unit, text area recognition on the target image to obtain a text area image of a target text corresponding to the certificate to be recognized, determines, by a direction unit, a text direction of the target text according to the text area image; performs, by an adjustment unit, direction adjustment on the text area image according to the text direction to obtain an adjusted text area image; and performs, by a recognition unit, text recognition based on the adjusted text area image to obtain a text content of the target text. Therefore, the embodiments of the present disclosure can improve the efficiency of the image recognition method.

An electronic device is further provided in the embodiments of the present disclosure. The electronic device may be a device such as a terminal and a server. The terminal may be a device such as a mobile phone, a tablet computer, a smart Bluetooth device, a notebook computer, or a PC; and the server may be a single server or a server cluster that includes a plurality of servers.

In some embodiments, the image recognition apparatus may also be integrated in a plurality of electronic devices. For example, the image recognition apparatus may be integrated in a plurality of servers, and the plurality of servers implement the image recognition method of the present disclosure.

Figure 4:
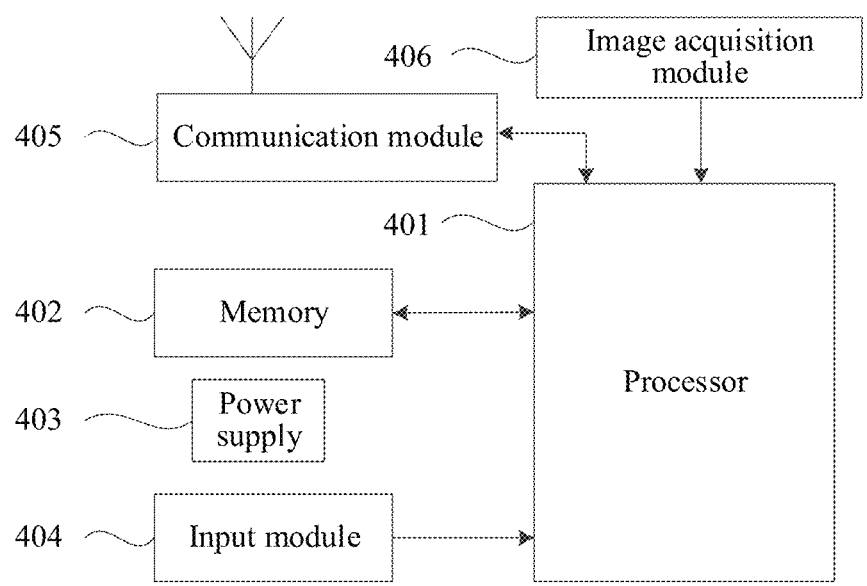
FIG. 4 is a schematic structural diagram of a terminal according to an embodiment of the present disclosure.

In this embodiment, a detailed description will be given by taking the electronic device of this embodiment being a terminal as an example. For example, as shown in FIG. 4, a schematic structural diagram of a terminal involved in an embodiment of the present disclosure is shown. Specifically:

The terminal may include components such as a processor 401 with one or more processing cores, a memory 402 with one or more computer-readable storage media, a power supply 403, an input module 404, and a communication module 405. A person skilled in the art may understand that the terminal structure shown in FIG. 4 does not constitute a limitation on the terminal, and may include more or fewer components than shown, or combine some components, or have different component arrangements. Here:

The processor 401 is a control center of the terminal, and connects to various parts of the terminal by using various interfaces and lines. By running or executing the software program and/or module stored in the memory 402, and invoking data stored in the memory 402, the processor performs various functions and data processing of the terminal, thereby performing overall monitoring on the terminal. In some embodiments, the processor 401 may include one or more processing cores. In some embodiments, the processor 401 may integrate an application processor and a modem. The application processor mainly processes an operating system, a user interface, an application program, and the like. The modem mainly processes wireless communication. It may be understood that the foregoing modem may either not be integrated into the processor 401.

The memory 402 may be configured to store a software program and a module. The processor 401 runs the software program and the module stored in the memory 402, to implement various functional applications and data processing of the mobile phone. The memory 402 may mainly include a program storage area and a data storage area. The program storage area may store an operating system, an application program required by at least one function (for example, a sound playback function and an image playback function), or the like. The data storage area may store data created according to use of the terminal. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The terminal further includes a power supply 403 supplying power to the components. In some embodiments, the power supply 403 may be logically connected to the processor 401 by using a power management system, thereby implementing functions such as charging, discharging, and power consumption management by using the power management system. The power supply 403 may further include one or more of a direct current or alternating current power supply, a re-charging system, a power failure detection circuit, a power supply converter or inverter, a power supply state indicator, and any other component.

The terminal may further include an input module 404. The input module 404 may be configured to receive inputted digit or character information, and generate a keyboard, mouse, joystick, optical or track ball signal input related to the user setting and function control.

The terminal may also include a communication module 405. In some embodiments, the communication module 405 may include a wireless module. The terminal may perform short-distance wireless transmission through the wireless module of the communication module 405, thereby providing users with wireless broadband Internet access. For example, the communication module 405 may be configured to help users transmit and receive emails, browse web pages, access streaming media, and the like.

The terminal may also include an image acquisition module 406. In some embodiments, the image acquisition module 406 may include a camera module, and the terminal may perform image acquisition through the camera module of the image acquisition module 406, thereby providing users with an image acquisition function. For example, the image acquisition module 406 may be configured to help the users photograph images to be recognized, and record certificates to be recognized, videos for face recognition, and the like.

Although not shown in the figure, the terminal may further include a display unit, and the like. Details are not described herein again. Specifically, in this embodiment, the processor 401 in the terminal may load executable files corresponding to processes of one or more applications to the memory 402 according to the following instructions, and the processor 401 runs an application stored in the memory 402, to implement various functions as follows:

acquiring a target image, the target image being an image of a certificate to be recognized;
performing text area recognition on the target image to obtain a text area image of a target text corresponding to the certificate to be recognized;
determining a text direction of the target text according to the text area image;
performing direction adjustment on the text area image according to the text direction to obtain an adjusted text area image; and
performing text recognition based on the adjusted text area image to obtain a text content of the target text.

For specific implementations of the above operations, refer to the foregoing embodiments. Details are not described herein again.

As can be seen from the above, the embodiments of the present disclosure can improve the efficiency of the image recognition method.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, the embodiments of the present disclosure provide a non-volatile computer-readable storage medium, storing a plurality of instructions, the instructions being configured to be loaded by the processor, to perform the steps of any image recognition method according to the embodiments of the present disclosure. For example, the instructions may perform the following steps:

acquiring a target image, the target image being an image of a certificate to be recognized;
performing text area recognition on the target image to obtain a text area image of a target text corresponding to the certificate to be recognized;
determining a text direction of the target text according to the text area image;
performing direction adjustment on the text area image according to the text direction to obtain an adjusted text area image; and
performing text recognition based on the adjusted text area image to obtain a text content of the target text.

The storage medium may include a read-only memory (ROM), a random access memory (RAM), a magnetic disk, an optical disc, or the like.

Because the instructions stored in the storage medium may perform the steps of any image recognition method provided in the embodiments of the present disclosure, the instructions can implement beneficial effects that can be implemented by any image recognition method provided in the embodiments of the present disclosure. For details, reference may be made to the foregoing embodiments. Details are not described herein again.

The image recognition method and apparatus, a terminal, and a computer-readable storage medium provided in the embodiments of the present disclosure are described above in detail. Although the principles and implementations of the present disclosure are described by using specific examples in this specification, the descriptions of the foregoing embodiments are merely intended to help understand the method and the core idea of the present disclosure. Meanwhile, a person skilled in the art may make modifications to the specific implementations and application range according to the idea of the present disclosure. In conclusion, the content of this specification is not construed as a limit on the present disclosure.

An image recognition method, apparatus, terminal, and storage medium are disclosed in embodiments of this application. In the embodiments of the present disclosure, a target image may be acquired, the target image being an image of a certificate to be recognized; text area recognition is performed on the target image to obtain a text area image of a target text corresponding to the certificate to be recognized; a text direction of the target text is determined according to the text area image; direction adjustment is performed on the text area image according to the text direction to obtain an adjusted text area image; and text recognition is performed based on the adjusted text area image to obtain a text content of the target text. In the present disclosure, the text area image of the target text in the target image may be extracted, and the text direction of the target text may be determined.

After the text direction is used automatically to correct an inclined or inverted text area image, the text area image can be used for text recognition, thereby improving the accuracy of text recognition. Therefore, this solution can improve the efficiency of the image recognition method.

What is claimed is:

1. An image recognition method, performed by an electronic device, comprising:
   acquiring a target image, the target image being an image of a certificate to be recognized;
   performing text area recognition on the target image to obtain a text area image of a target text corresponding to the certificate to be recognized: comprising:
      performing image feature extraction on the target image to obtain an image feature of the target image; and
      performing image type recognition on the target image according to the image feature by using an image classification network, and determining an image type of the target mage and a certificate direction of the target image, wherein the certificate direction refers to a front direction of the certificate to be recognized in the target image;
   determining, by using the image classification network, a text direction of the target text according to the text area image, wherein the certificate direction and the text direction are both included in an output layer of the image classification network;
   performing direction adjustment on the text area image by using the text direction and the certificate direction at the same time to obtain an adjusted text area image; and
   performing text recognition on the adjusted text area image to obtain a text content of the target text.

2. The image recognition method of claim 1, wherein the performing text area recognition on the target image to obtain a text area image of a target text corresponding to the certificate to be recognized comprises:
   when the image type of the target image is a preset certificate type, performing text area segmentation on the target image according to the image feature by using a region-based detection network to obtain the text area image of the target text corresponding to the certificate to be recognized.

3. The image recognition method of claim 2, wherein the performing image feature extraction on the target image to obtain an image feature of the target image comprises:
   performing image segmentation processing on the target image to obtain an image segment group, the image segment group comprising a plurality of image segments;
   performing multi-scale feature extraction on the image segment group by using a group convolutional network to obtain a plurality of image segment feature groups in different sizes, wherein image segment features in each image feature group are in a same size; and
   performing feature fusion processing based on the image segment feature groups in different sizes to obtain the image feature of the target image.

4. The image recognition method of claim 2, wherein the performing text area segmentation on the target image according to the image feature by using a region-based detection network to obtain the text area image of the target text corresponding to the certificate to be recognized comprises:
   determining a text area location feature according to the image feature by using a region-based detection network;
   determining text area location feature points in the target image according to the text area location feature; and
   segmenting the target image according to the text area location feature points to obtain the text area image, the text area image being an image comprising the target text.

5. The image recognition method of claim 4, wherein after the determining a text area location feature according to the image feature by using the region-based detection network, the method further comprises:
   determining a direction feature of the target text in the text area image according to the image feature by using the region-based detection network;
   the determining the text direction of the target text according to the text area image comprises:
   determining the text direction of the target text according to the direction feature of the text area image by using the region-based detection network.

6. The image recognition method of claim 5, wherein the region-based detection network comprises a multi-channel output layer, and the determining the text direction of the target text according to the direction feature of the text area image by using the region-based detection network comprises:
   determining direction prediction values of pixels in the text area image according to the direction feature in the multi-channel output layer;
   performing statistics on the direction prediction values of the pixels in the text area image to obtain a global direction value of the text area image; and
   determining the text direction of the target text according to the global direction value.

7. The image recognition method of claim 1, wherein the performing text recognition based on the adjusted text area image to obtain a text content of the target text comprises:
   performing image segmentation processing on the text area image to obtain a text area image segment;
   performing feature extraction on the text area image segment by using a group convolutional network to obtain a text area image segment feature;
   determining a target text feature according to the text area image segment feature; and
   performing text recognition based on the target text feature by using a bidirectional recurrent network to obtain the text content of the target text.

8. The image recognition method of claim 7, wherein the bidirectional recurrent network comprises a forward layer and a backward layer, and the performing text recognition based on the target text feature by using a bidirectional recurrent network to obtain the text content of the target text comprises:
   determining a current moment in the bidirectional recurrent network, a forward hidden layer state corresponding to a previous moment of the current moment, and a backward hidden layer state corresponding to a next moment of the current moment;
   determining a forward hidden layer state of the forward layer at the current moment according to the target text feature and the forward hidden layer state of the forward layer at the previous moment;
   determining a backward hidden layer state of the backward layer at the current moment according to the target text feature and the backward hidden layer state of the backward layer at the next moment;

determining a text semantic vector according to the forward hidden layer state of the forward layer at the current moment and the backward hidden layer state of the backward layer at the current moment; and determining the text content of the target text according to the text semantic vector.

9. The image recognition method of claim 1, wherein the text direction comprises a first direction, a second direction, a third direction, and a fourth direction, and the performing direction adjustment on the text area image according to the text direction to obtain an adjusted text area image comprises:

when the text direction is the first direction, regarding the text area image as the adjusted text area image;

when the text direction is the second direction, rotating the text area image counterclockwise by 90 degrees to obtain the adjusted text area image;

when the text direction is the third direction, rotating the text area image counterclockwise by 180 degrees to obtain the adjusted text area image; and when the text direction is the fourth direction, rotating the text area image counterclockwise by 270 degrees to obtain the adjusted text area image.

10. The image recognition method of claim 1, wherein before the performing text recognition based on the adjusted text area image to obtain a text content of the target text, the method further comprises:

acquiring a text area training sample image and a preset recurrent convolutional network, wherein the text content of the target text is annotated in the text area training sample image, and the preset recurrent convolutional network comprises a group convolutional network, a bidirectional recurrent network, and a connectionist temporal classifier; and training the preset recurrent convolutional network according to the text area training sample image, until the connectionist temporal classifier determines that the preset recurrent convolutional network is converged, to obtain a recurrent convolutional network; and the performing text recognition based on the adjusted text area image to obtain a text content of the target text comprises:

performing text recognition based on the adjusted text area image by using the recurrent convolutional network to obtain the text content of the target text.

11. The image recognition method of claim 1, wherein the determining the text direction of the target text according to the text area image comprises:

acquiring a training sample image, a preset image classification network, and a preset region-based detection network, the training sample image being annotated with a certificate direction and a text direction;

processing the training sample image by using the preset image classification network to obtain a certificate direction training result;

training the preset region-based detection network according to the training sample image and the certificate direction training result, until the preset region-based detection network is converged, to obtain the trained region-based detection network; and determining the text direction of the target text according to the text area image by using the trained region-based detection network.

12. The method according to claim 1, wherein the image classification network comprises region based convolutional neural networks.

13. The method according to claim 1, wherein the certificate direction and the text direction are determined using different channels at the output layer of the image classification network.

14. An image recognition apparatus, comprising a processor and a memory, and the memory storing a plurality of instructions; the processor loading the instructions from the memory to perform:

acquiring a target image, the target image being an image of a certificate to be recognized;

performing text area recognition on the target image to obtain a text area image of a target text corresponding to the certificate to be recognized: comprising:

performing image feature extraction on the target image to obtain an image feature of the target image; and performing image type recognition on the target image according to the image feature by using an image classification network, and determining an image type of the target mage and a certificate direction of the target image, wherein the certificate direction refers to a front direction of the certificate to be recognized in the target image;

determining, by using the image classification network, a text direction of the target text according to the text area image, wherein the certificate direction and the text direction are both included in an output layer of the image classification network;

performing direction adjustment on the text area image by using the text direction and the certificate direction at the same time to obtain an adjusted text area image; and performing text recognition on the adjusted text area image to obtain a text content of the target text.

15. The image recognition apparatus of claim 14, wherein the performing text area recognition on the target image to obtain a text area image of a target text corresponding to the certificate to be recognized comprises:

when the image type of the target image is a preset certificate type, performing text area segmentation on the target image according to the image feature by using a region-based detection network to obtain the text area image of the target text corresponding to the certificate to be recognized.

16. The image recognition apparatus of claim 15, wherein the performing image feature extraction on the target image to obtain an image feature of the target image comprises:

performing image segmentation processing on the target image to obtain an image segment group, the image segment group comprising a plurality of image segments;

performing multi-scale feature extraction on the image segment group by using a group convolutional network to obtain a plurality of image segment feature groups in different sizes, wherein image segment features in each image feature group are in a same size; and performing feature fusion processing based on the image segment feature groups in different sizes to obtain the image feature of the target image.

17. The image recognition apparatus of claim 15, wherein the performing text area segmentation on the target image according to the image feature by using a region-based detection network to obtain the text area image of the target text corresponding to the certificate to be recognized comprises:

determining a text area location feature according to the image feature by using a region-based detection network;

determining text area location feature points in the target image according to the text area location feature; and segmenting the target image according to the text area location feature points to obtain the text area image, the text area image being an image comprising the target text.

18. The image recognition apparatus of claim 17, wherein after the determining a text area location feature according to the image feature by using the region-based detection network, the processor is further configured to perform:

determining a direction feature of the target text in the text area image according to the image feature by using the region-based detection network;

the determining the text direction of the target text according to the text area image comprises:

determining the text direction of the target text according to the direction feature of the text area image by using the region-based detection network.

19. The image recognition apparatus of claim 18, wherein the region-based detection network comprises a multi-channel output layer, and the determining the text direction of the target text according to the direction feature of the text area image by using the region-based detection network comprises:

determining direction prediction values of pixels in the text area image according to the direction feature in the multi-channel output layer;

performing statistics on the direction prediction values of the pixels in the text area image to obtain a global direction value of the text area image; and determining the text direction of the target text according to the global direction value.

20. A non-transitory computer-readable storage medium storing a plurality of instructions, the instructions being adaptable to be loaded by a processor to perform:

acquiring a target image, the target image being an image of a certificate to be recognized;

performing text area recognition on the target image to obtain a text area image of a target text corresponding to the certificate to be recognized: comprising:

performing image feature extraction on the target image to obtain an image feature of the target image; and performing image type recognition on the target image according to the image feature by using an image classification network, and determining an image type of the target mage and a certificate direction of the target image, wherein the certificate direction refers to a front direction of the certificate to be recognized in the target image;

determining, by using the image classification network, a text direction of the target text according to the text area image, wherein the certificate direction and the text direction are both included in an output layer of the image classification network;

performing direction adjustment on the text area image by using the text direction and the certificate direction at the same time to obtain an adjusted text area image; and performing text recognition on the adjusted text area image to obtain a text content of the target text.

* * * * *